US009300389B2

(12) United States Patent
Calmettes et al.

(10) Patent No.: US 9,300,389 B2
(45) Date of Patent: Mar. 29, 2016

(54) METHOD FOR PROPAGATING MESSAGES IN A COMMUNICATION NETWORK TO A SATELLITE NETWORK

(75) Inventors: Thibaud Calmettes, Toulouse (FR); Michel Monnerat, Saint Jean (FR); Phillippe Karouby, Balma (FR)

(73) Assignee: THALES, Courbevoie (FR)

( * ) Notice: Subject to any disclaimer, the term of this patent is extended or adjusted under 35 U.S.C. 154(b) by 657 days.

(21) Appl. No.: 13/640,296

(22) PCT Filed: Mar. 30, 2011

(86) PCT No.: PCT/EP2011/054949
§ 371 (c)(1),
(2), (4) Date: Oct. 9, 2012

(87) PCT Pub. No.: WO2011/128206
PCT Pub. Date: Oct. 20, 2011

(65) Prior Publication Data
US 2013/0029593 A1    Jan. 31, 2013

(30) Foreign Application Priority Data

Apr. 16, 2010   (FR) ..................................... 10 01635

(51) Int. Cl.
*H04B 7/185*   (2006.01)

(52) U.S. Cl.
CPC ........ *H04B 7/18508* (2013.01); *H04B 7/18504* (2013.01); *H04B 7/18506* (2013.01)

(58) Field of Classification Search
CPC .. H04B 7/18532; H04L 12/589; H04L 51/00; H04L 51/14; H04L 51/36; H04L 29/06; H04L 51/34; H04L 51/38; G01S 19/02

USPC ............ 455/12.1, 414.1, 423, 428, 427, 429, 455/431, 456.1; 342/356, 357.46; 370/316
See application file for complete search history.

(56) References Cited

U.S. PATENT DOCUMENTS 6,018,659 A * 1/2000 Ayyagari et al. .............. 455/431
6,127,946 A * 10/2000 Tzidon et al. .................. 340/988
(Continued)

FOREIGN PATENT DOCUMENTS

EP    0 837 567 A2    4/1998
EP    2 086 279 A1    8/2009
(Continued)

*Primary Examiner* — Shaima Q Aminzay
(74) *Attorney, Agent, or Firm* — Baker & Hostetler LLP

(57) ABSTRACT

A method is provided for propagating messages in a communication network to a satellite network, the communication network being made up of a set of users and the satellite network comprising at least one satellite, the set of users comprising a sender and a recipient, said recipient being intended to send to the satellite network an initial message originating from the sender, at least one satellite of the satellite network being visible to said recipient, in which each user determines a number of intermediaries needed to reach the recipient and periodically sends a message comprising said number of intermediaries needed to reach the recipient, and said initial message being sent by the sender to the visible user having the lowest possible number of necessary intermediaries, called optimal intermediary, said optimal intermediary becoming, in turn, sender and sending the initial message, the operation being repeated until the recipient is reached.

10 Claims, 1 Drawing Sheet

(56) References Cited

U.S. PATENT DOCUMENTS

2009/0092074 A1* 4/2009 Jamalipour et al. ......... 370/316
2009/0197595 A1* 8/2009 Kauffman et al. ............ 455/431

FOREIGN PATENT DOCUMENTS

| WO | 99/46877 A1 | 9/1999 |
| WO | 2007/059560 A1 | 5/2007 |

* cited by examiner

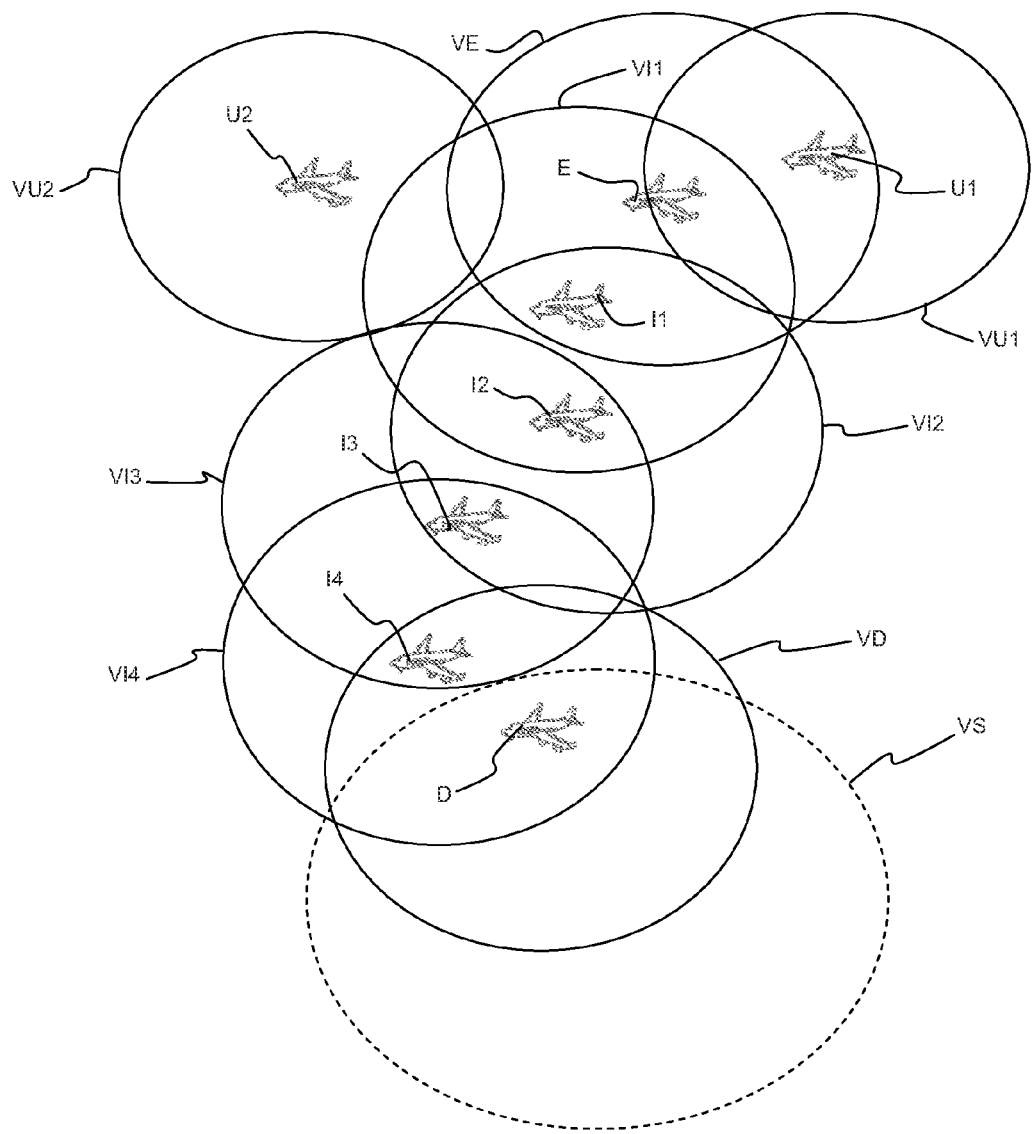

METHOD FOR PROPAGATING MESSAGES IN A COMMUNICATION NETWORK TO A SATELLITE NETWORK

CROSS-REFERENCE TO RELATED APPLICATIONS

This application is a National Stage of International patent application PCT/EP2011/054949, filed on Mar. 30, 2011, which claims priority to foreign French patent application No. FR 1001635, filed on Apr. 16, 2010, the disclosures of which are incorporated by reference in their entirety.

FIELD OF THE INVENTION

The present invention relates to a method that aims to optimize the propagation of information in a communication network to a satellite network.

More specifically, the information is based on dynamically keeping up-to-date the map of the users of the communication network, so as to determine an optimum path within said communication network, from a sender to a recipient, by passing through the fewest intermediaries.

BACKGROUND

The general issue associated with the present invention is to do with the collection of data by satellite. The objective is to propagate information to a satellite network, whether it is low volume periodic data or high volume instantaneous data. These data have to be able to be transmitted in real time by senders that may be ground stations or aircraft.

More particularly, the present invention targets the monitoring of global aeronautical traffic. In this context, the information to be propagated typically relates to periodic monitoring data and the content of the black boxes in the event of accidents.

Currently, it is generally essential, to be able to transmit data from the ground to a satellite network, for the sending user to be in sight of at least one satellite of the satellite network, in the sense that at least one satellite of the satellite network has to be able to receive a message containing said data, sent by the sending user. To allow for global monitoring, it is consequently currently necessary for the satellite network used to have global coverage. The current solutions use either geostationary satellites, allowing for global coverage apart from the poles, or constellations of satellites in low earth orbit consisting of a large number of satellites, typically approximately 80 satellites.

In the context targeted as a priority, namely that of global aeronautical monitoring, it would be very prejudicial not to be able to cover the poles; the solution comprising geostationary satellites is therefore excluded straight away.

The drawback that arises from the use, or even the deployment, of a constellation of satellites in low earth orbit comprising several tens of satellites lies in the very high complexity and cost inherent in such systems.

SUMMARY OF THE INVENTION

One aim of the invention is notably to mitigate the above-mentioned drawbacks. The main technical problem resolved by the present invention therefore relates to the propagation of messages from the ground to a satellite network in a way that is simple and optimized in terms of cost.

Thus, the subject of the invention is a method for propagating messages in a communication network to a satellite network, the communication network being made up of a set of users and the satellite network comprising at least one satellite, the set of users comprising a sender and a recipient, said recipient being intended to send to the satellite network an initial message originating from the sender, at least one satellite of the satellite network being visible to said recipient, that is to say able to receive a message sent by said recipient, each user being able to send a message with a range such that a subset of visible users is able to receive said message, and said message being able to be transmitted from user to user, so that, the sender sending the initial message, said initial message can be transmitted to the recipient by passing through a certain number of intermediary users. Said method is characterized in that each user determines a number of intermediaries needed to reach the recipient and periodically sends a message comprising said number of intermediaries needed to reach the recipient, and in that said initial message is sent by the sender to the visible user having the lowest possible number of necessary intermediaries, called optimum intermediary, said optimum intermediary becoming, in turn, sender and sending the initial message, the operation being repeated until the recipient is reached.

The users are generally aircraft and/or ground stations.

According to one implementation of the method according to the invention, at least some of the users have a fixed position known to the sender.

Advantageously, the message sent periodically by the set of users may comprise the position of the user concerned.

Advantageously, the message sent periodically by the set of users may also comprise the speed of the user concerned.

Advantageously, the message sent periodically by the set of users may also comprise the heading of the user concerned.

Advantageously, the message sent periodically by the set of users also comprises information on a duration of validity during which the number of intermediaries needed to reach the recipient contained in said message for the user concerned is valid.

Advantageously, the message sent periodically by the set of users also comprises a future number of intermediaries needed to reach the recipient after said duration of validity has elapsed, said future number of intermediaries needed to reach the recipient having its own duration of validity.

Advantageously, the message sent periodically by the set of users also comprises a succession of future numbers of intermediaries needed to reach the recipient after said duration of validity has elapsed, each future number of intermediaries needed to reach the recipient having its own duration of validity.

Advantageously, the sender determines, in real time, the estimated position of the users of the communication network and dynamically determines the shortest path by which the initial message can reach the recipient by passing through the lowest possible number of intermediaries.

BRIEF DESCRIPTION OF THE DRAWINGS

Other features and advantages of the invention will become apparent from the following description, given in light of the appended FIG. 1 which represents the schematic principle of the invention.

DETAILED DESCRIPTION

FIG. 1 presents a diagram of a communication network consisting of aircraft U1, U2, E, I1, I2, I3, I4, D. In the example of FIG. 1, the aircraft E is the sender of an initial message that has to be transmitted to a satellite network of which one satellite, not represented, is in sight of the aircraft D, the area VD representing a section of the cone of visibility of a satellite of the satellite network. The basic principle lies in the propagation of the initial message step by step, that is to say from one user to another, until it reaches an aircraft in sight of a satellite of the satellite network, called the recipient D. Thus, the sender E sends the initial message to a first intermediary user I1, which resends said initial message to a second intermediary I2 . . . etc., until it reaches the recipient D, which is able to convey the initial message to the satellite network.

For each aircraft U1, U2, E, I1, I2, I3, I4, D, an area of visibility, respectively VU1, VU2, VE, VI1, VI2, VI3, VI4, VD, represents the range of the messages sent by each of the aircraft. In FIG. 1, it will be observed for example that the aircraft U1 and I1 are able to receive a message sent by the aircraft E. The aircraft E, the sender of an initial message, can thus broadcast the initial message to at least one neighboring aircraft, for example the intermediary I1, the latter in turn broadcasting said initial message to another intermediary, for example the aircraft I2, the operation being repeated until it reaches an aircraft which is able to broadcast the initial message to the satellite network. In FIG. 1, the aircraft that is the recipient of the initial message is the recipient aircraft D, because it is located in the area of visibility VD of a satellite of the satellite network. Thus, the communication network according to the invention, made up of a set of users such as aircraft U1, U2, E, I1, I2, I3, I4, D, as in FIG. 1, and/or ground stations and/or any mobile or immobile object on land, at sea or in the air, forms a kind of mesh network within which the initial message is propagated step by step between a sender E and a recipient D, said recipient D being charged with transmitting the initial message to a satellite network.

The invention therefore relies, synthetically, on an optimization of the principle of data propagation in a mesh network.

According to the invention, each user of the communication network, namely each aircraft U1, U2, E, I1, I2, I3, I4, D, sends a periodic message containing the number of intermediaries needed in order, from its point of view, to reach a user which is in sight of a satellite of the satellite network. Step by step, this information is broadcast and reaches the sending aircraft E. Thus, the aircraft D, in sight of a satellite of the satellite network, indicates a number of intermediaries needed to reach a user which is in sight of the satellite equal to 0. The aircraft I4, which receives this information, therefore for itself indicates a number of intermediaries needed to reach a user which is in sight of the satellite equal to 1.

At the time of sending the initial message, the sending aircraft E knows the number of intermediaries needed to reach the recipient aircraft D, the closest aircraft in sight of a satellite of the satellite network, for each of the visible aircraft, namely the aircraft I1 and U1 in FIG. 1. The aircraft E will then send the initial message to the visible aircraft having the lowest possible number of intermediaries needed to reach the recipient aircraft D. If the aircraft U1 has a number of intermediaries needed greater than 4, the aircraft E sends the initial message to the intermediary aircraft I1 which has a number of intermediaries needed equal to 4. The operation is repeated until the initial message is received by the recipient aircraft D, the latter broadcasting said initial message to the satellite network.

In a preferred embodiment, in addition to the number of intermediaries needed to reach the closest recipient D, each user broadcasts to its neighbors its position, even its speed and its heading.

Based on the position of each of the users, the method according to the invention consists in establishing and dynamically maintaining a map of the network and in identifying the shortest and/or the most reliable paths for broadcasting the initial message to a recipient user, in sight of a satellite of the satellite network. It is thus possible to estimate the position of each recipient, that is to say, in the case of FIG. 1, of each aircraft such as the aircraft D, visible to a satellite of the satellite network.

According to the invention, provision is also made to take into consideration the speed and the heading of each user in order to best estimate, dynamically, the position of each recipient within the communication network. This estimation may be based on the knowledge of the ephemerides of the satellites of the satellite network concerned.

To sum up, the method according to the invention therefore entails keeping up-to-date the map of the communication network made up of a set of users. In particular, the users in sight of a satellite of the satellite network, that is to say the recipients such as the aircraft D in FIG. 1, have their position known to the communication network, said position being able to be anticipated by virtue of the knowledge of their speed, heading, trajectory. As has been seen on the other hand, each user of the network broadcasts the number of intermediaries needed to reach a user which is in sight of a satellite of the satellite network, for that which concerns it; it is therefore possible for the user sending an initial message, such as the aircraft E in FIG. 1, to determine the optimum path to reach the closest recipient, namely the aircraft D in FIG. 1.

Optionally, based on the knowledge of the positions and the relative movements of the users, which can be deduced from their speeds and headings, and of the satellites, using the ephemerides, each user can broadcast in the periodic message transmitted to its visible neighbors, in addition to the number of intermediaries needed to reach a user which is in sight of a satellite of the satellite network and its position, speed and heading, information on a duration of validity corresponding to the duration for which the number of intermediaries needed to reach a user which is in sight of a satellite, transmitted in the periodic message, is valid.

Moreover, the periodic message may also comprise a list of future numbers of necessary intermediaries associated with durations of validity, which are successively valid for each user concerned. For example, a periodic message transmitted by a user may comprise the following information:

currently: intermediary of distance 1—meaning: "having a number of necessary intermediaries equal to 1";

in 10 seconds: recipient;

in 30 seconds: intermediary of distance 1;

in 45 seconds: intermediary of distance 3 . . . and so on.

The method according to the invention may also comprise a redundancy aspect. In fact, the sending user may send the initial message over two distinct paths, leading to the same satellite of the satellite network or to two different satellites.

Also, it should be noted that the present invention relates as a priority to the communications originating from aircraft to a satellite network, as in the example of FIG. 1. However, the communication network that is targeted may equally, as an alternative or additionally, comprise ground stations, any type of fixed or mobile elements on land or at sea. For example, the method according to the invention is suited to port communications to a satellite network.

The method according to the invention makes it possible to dispense with the need for constellations comprising several tens of satellites. Typically, the system can be implemented with a satellite network made up of 4 to 10 satellites. In a preferred embodiment, the satellite network comprises 6 satellites.

In addition, the method according to the invention can nevertheless, in cases of force majeure, provide for the use of global satellite constellations when the sending user has no knowledge of any accessible recipient user.

The invention claimed is:

1. A method for propagating messages in a communication network to a satellite network, the communication network being made up of a set of users and the satellite network comprising at least one satellite, the set of users comprising a sender and a recipient, said recipient being intended to send to the satellite network an initial message originating from the sender, at least one satellite of the satellite network being visible to said recipient, said satellite being able to receive messages sent by said recipient, each user in the set of users being able to send a message with a range such that a subset of users, being visible users, can receive said messages, so that a message can be transmitted from user to user, so that, the initial message sent by the sender, can be transmitted to the recipient by passing through a number of intermediary users, the number being between: zero, if the sender and recipient are visible users to each other, and infinite, if there is no chain of intermediate users going to the recipient, each user determining a number of intermediaries needed to reach the recipient and periodically sending a message comprising said number of intermediaries needed to reach the recipient, and wherein said initial message is sent by the sender to a visible user having a lowest number of intermediaries to reach the recipient, being an optimal intermediary, said optimal intermediary becoming, in turn, sender and sending the initial message, the operation being repeated until the recipient is reached.

2. The method as claimed in claim 1, wherein the users are aircraft and/or ground stations.

3. The method as claimed in claim 1, in which at least some of the users have a fixed position known to the sender.

4. The method as claimed in claim 1, wherein the message sent periodically by the set of users comprises the position of the user concerned.

5. The method as claimed in claim 4, wherein the message sent periodically by the set of users also comprises the speed of the user concerned.

6. The method as claimed in claim 4, wherein the message sent periodically by the set of users also comprises the heading of the user concerned.

7. The method as claimed in claim 4, wherein the sender determines, in real time, the estimated position of the users of the communication network and dynamically determines the shortest path by which the initial message can reach the recipient by passing through the lowest number of intermediaries to reach the recipient.

8. The method as claimed in claim 1, wherein the message sent periodically by the set of users also comprises information on a duration of validity during which the number of intermediaries needed to reach the recipient contained in said message for the user concerned is valid.

9. The method as claimed in claim 8, wherein the message sent periodically by the set of users also comprises a future number of intermediaries needed to reach the recipient after said duration of validity has elapsed, said future number of intermediaries needed to reach the recipient having its own duration of validity.

10. The method as claimed in claim 7, wherein the message sent periodically by the set of users also comprises a succession of future numbers of intermediaries needed to reach the recipient after said duration of validity has elapsed, each future number of intermediaries needed to reach the recipient having its own duration of validity.

* * * * *

UNITED STATES PATENT AND TRADEMARK OFFICE
CERTIFICATE OF CORRECTION

PATENT NO.        : 9,300,389 B2                                              Page 1 of 1
APPLICATION NO.   : 13/640296
DATED             : March 29, 2016
INVENTOR(S)       : Thibaud Calmettes et al.

It is certified that error appears in the above-identified patent and that said Letters Patent is hereby corrected as shown below:

In the claims:

Column 6, In line 1 of claim 10, "as claimed in claim 7" should be --as claimed in claim 8--.

Signed and Sealed this
Tenth Day of May, 2016

Michelle K. Lee
*Director of the United States Patent and Trademark Office*